May 22, 1962  A. STENGELIN  3,035,851
STABILIZING SYSTEM FOR MOTOR VEHICLES
Filed Sept. 8, 1959
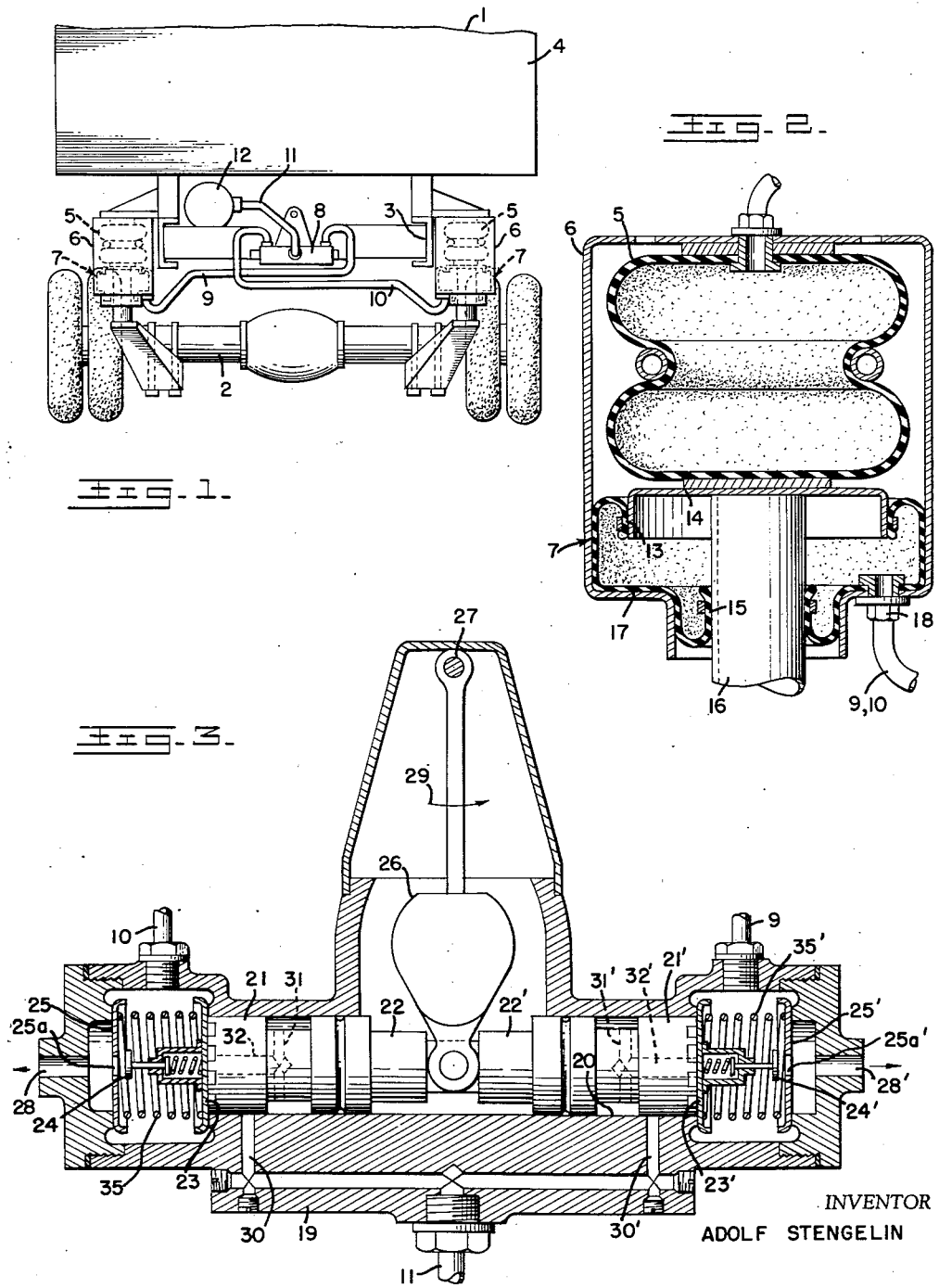
INVENTOR
ADOLF STENGELIN
BY Dickes, Craig and Freudenberg
ATTORNEYS

United States Patent Office 3,035,851
Patented May 22, 1962

3,035,851
STABILIZING SYSTEM FOR MOTOR VEHICLES
Adolf Stengelin, Stuttgart, Germany, assignor to Daimler-Benz Aktiengesellschaft, Stuttgart-Unterturkheim, Germany
Filed Sept. 8, 1959, Ser. No. 838,506
Claims priority, application Germany Sept. 26, 1958
17 Claims. (Cl. 280—112)

The present invention relates to a motor vehicle provided with a pneumatic spring system and with an equalization arrangement essentially consisting of pneumatic springs and a control system which prevents or at least considerably reduces a lateral tilting of the vehicle body in the direction toward the outside of the curve while driving through curves.

The present invention essentially consists in that each pneumatic spring or pneumatic springs provided for the tilting equalization on each vehicle side is or are arranged in such a manner that, on the one hand, with an increasing internal pressure within the pneumatic spring or springs, the vehicle parts such as vehicle body and wheel axle separated effectively from each other by the spring system are increasingly moved toward each other and that, on the other, the control arrangement is so constructed that while driving through a curve the pneumatic spring or springs disposed along the inner side of the curve is or are operatively connected with a source of compressed air for purposes of realizing the equalization operation whereas the pneumatic spring or springs disposed along the outer side of the curve is or are operatively connected with the atmosphere for purposes of realizing the equalization operation of the tilting movement.

In the prior art, pneumatic springs were arranged and controlled in motor vehicles for purposes of tilting equalization while driving through curves in such a manner that the pneumatic spring of the equalization arrangement disposed along the outer side of the curve was filled with compressed air while driving through the curve in order to lift the vehicle body at least up to the horizontal position thereof. However, as a result of filling the pneumatic spring located on the outer side of the curve, for purposes of achieving the tilting equalization, the spring characteristics of the spring system of the motor vehicle disposed at the outside of the curve was effectively stiffened thereby.

In contradistinction thereto, the present invention achieves equalization in which, while driving through a curve, the more strongly or heavily loaded outside springs are not influenced in the spring characteristics thereof but instead a force directed in opposition to the main spring is produced at the pneumatic springs disposed at the inner side of the curve for realizing the tilting equalization. Such an arrangement renders possible thereby, in a particularly advantageous manner, an effective lowering of the center of gravity of the vehicle during curve drives, which, in turn, has a favorable effect as regards the lateral tilting. Moreover, in a system according to the present invention, the springs disposed along the outside of the curve are not stiffened.

According to a further feature and construction in accordance with the present invention, the pneumatic springs utilized for the tilting equalization may consist in an advantageous manner of roller-type bellows. Both ends of each roller-type bellows used for the tilting equalization may be operatively connected with a vehicle part participating in the spring movements whereas the roller bellows portion disposed intermediate these two ends may be secured at the vehicle part which does not partake in the spring movements. Moreover, according to still a further feature of the present invention, the roller bellows for the tilting equalization system may be arranged below the respective pneumatic springs for the motor vehicle spring system. In such an arrangement, the ends of each roller bellows participating in the spring movements may be arranged at the spring disk for the pneumatic spring and at a support part for this spring disk having a lesser diameter, for example, at a support rod, and the roller bellows portion secured to the vehicle part which does not participate in the spring movements may be secured at a pot-shaped, spring closure member surrounding the respective pneumatic spring and roller bellows.

According to another feature of the present invention, valves may be arranged in the control system for the pneumatic springs of the equalization system which valves operatively connect the pneumatic springs of the equalization system with the atmosphere during straight drives of the vehicle in such a manner that during inwardly or upwardly directed spring movements of the wheels, air is drawn into the pneumatic springs from the atmosphere without any substantial throttling whereas during outwardly or downwardly directed spring movements of the wheel, air is discharged into the atmosphere with a predetermined amount of throttling from the pneumatic springs of the equalization system. Such an arrangement makes it possible that the pneumatic springs ordinarily provided only for the tilting equalization during curve drives may simultaneously therewith be used as shock absorbers during straight drives.

The control arrangement for the pneumatic springs of the equalization system may consist essentially of control pistons actuated by an inertia pendulum, which control pistons, depending on the movement of the inertia pendulum under the influence of centrifugal forces, control the supply of compressed air to the pneumatic springs of the equalization system disposed along the inside of the curve by appropriately opening spring-loaded valves and by closing the connections between the pneumatic springs and the atmosphere.

Accordingly, it is an object of the present invention to provide a tilting equalization system, particularly for pneumatic spring systems of motor vehicles which obviates the disadvantages encountered with the prior art installations.

It is another object of the present invention to provide a curve tilting equalization system for pneumatic spring systems of motor vehicles in which the spring characteristics of the spring system and of the individual pneumatic springs remain essentially unaffected by operation of the equalization installation.

Still another object of the present invention resides in the provision of a tilting equalization installation for a pneumatic spring system of a motor vehicle in which the equalization devices may be used simultaneously as shock absorbers when the vehicle drives straight forward whereas the same equalization devices become effective as anti-tilt means when the vehicle drives through a curve.

Still another object of the present invention is the provision of an anti-tilt equalization system for motor vehicles which effectively lowers the center of gravity of the motor vehicle when driving through a curve.

These and other objects, features and advantages of the present invention will become more obvious from the following description when taken in connection with the accompanying drawing which shows, for purposes of illustration only, one embodiment in accordance with the present invention and wherein:

FIGURE 1 is an elevational rear view of a motor vehicle provided with a pneumatic spring system and with a curve-tilting equalization arrangement consisting of pneumatic springs in accordance with the present invention;

FIGURE 2 is a cross-sectional view, on an enlarged scale, through a pneumatic spring and a pneumatic antitilt equalization spring combined therewith; and FIGURE 3 is a cross-sectional view through a control arrangement for the pneumatic spring system of the curve-tilting equalization installation according to the present invention.

Referring now to the drawing, wherein like reference numerals are used throughout the various views to designate like parts, and more particularly to FIGURE 1, reference numeral 1 designates a motor vehicle, for example, a truck or bus, in which the wheel axle member 2 is spring supported with respect to the vehicle superstructure such as the frame 3 or body 4 by pneumatic springs 5. For purposes of protecting the springs against dirt, stone-throw or the like, each pneumatic spring 5 is arranged within a pot-shaped closure member 6 whereby additionally a pneumatic spring 7 for achieving the tilting equalization during curve drives and for damping the spring movements of the pneumatic springs 5 during straight drives is arranged in each pot-shaped enclosure member 6 below the respective pneumatic spring 5 at essentially the same wheel tread as the pneumatic springs. The control arrangement 8 serves for purposes of controlling the pneumatic springs 7 of the tilting equalization system whereby lines 9 and 10 lead to the pneumatic springs 7 while a line 11 operatively connects the control arrangement 8 with the tank or reservoir 12 for compressed air.

As becomes more clear from FIGURE 2, the pneumatic spring generally designated by reference numeral 7 consists of a roller-type bellows, the upper end 13 of which is connected with the spring disk 14 for the pneumatic spring 5 and the lower end 15 of which is connected with the support rod 16 for the spring disk 14. The pot-shaped closure member 6 is secured in any suitable manner at the superstructure, frame, or vehicle body of a motor vehicle whereas the support rod 16 is pivotally secured at the wheel axle 2 of the motor vehicle or at a part operatively connected therewith or cooperating therewith. The center portion 17 of the pneumatic spring 7 intermediate the two ends 13 and 15 is secured at the pot-shaped enclosure member 6 in any suitable manner. The connection 18 for line 9 or 10 is arranged within the area of this center portion 17 through which, during straight drives, either air from the atmosphere is drawn into the pneumatic spring 7 or air is discharged into the atmosphere, and through which at the beginning of curve drives compressed air is supplied if the particular pneumatic spring finds itself in the place of a pneumatic spring disposed along the inside of the curve.

The control arrangement designated in FIGURE 1 by reference numeral 8 is illustrated on an enlarged scale in cross section in FIGURE 3 which clearly illustrates the details thereof. In FIGURE 3, those parts on the right side of the control arrangement which control line 9 and which correspond to similar parts in the left side controlling line 10 are designated by primed reference numerals.

The control arrangement 8 essentially consists of housing 19, of the control slide valve members 22 and 22' slidably accommodated within bore 20 and provided with symmetrically arranged control pistons 21 and 21', of the valves 23 and 23' cooperating with the pistons 21 and 21', and also of valves 24 and 24', of valves 25 and 25', and of the inertia pendulum 26 which is pivotally suspended on pivot pin or shaft 27 disposed essentially parallel to the vehicle central longitudinal axis and which operatively engages in a fork-shaped manner in the control slide valve member 22. The valves 24 and 24' thereby control an aperture 25a and 25a' provided in valve disks 25 and 25', respectively.

*Operation*

The operation of the control system of FIGURE 3 in combination with the pneumatic equalization spring system according to the present invention is as follows:

During straight drives of the vehicle, all parts of the control system assume the positions thereof as illustrated in FIGURE 3. If now inward or upward spring movements of the wheels take place, i.e., the wheel axle 2 moves in the direction toward the frame 3 and therewith compresses the pneumatic springs 5, then the volume of each affected pneumatic spring 7 increases and the pneumatic springs 7 draw in air from the atmosphere through the apertures 28 and 28' provided in housing 19 of the control arrangement 8, through the apertures 25a and 25a' of valves 25 and 25' which are lifted now from their valve seats and through lines 9 and 10, respectively. During outward spring movements, i.e., when the wheel axle 2 moves away from the vehicle frame 3 and therewith relieves the pneumatic springs 5, the air drawn into the pneumatic springs 7 is discharged into the atmosphere with predetermined throttling from the pneumatic springs 7 through lines 9 and 10 with valves 25 and 25' now closed and with valves 24 and 24' now opened through the apertures 25a and 25a' provided in valve disks 25 and 25' and through apertures 28 and 28'. Consequently, the pneumatic springs 7 are effective during straight drives of the motor vehicle as damping devices or shock absorbers for the pneumatic springs 5 of the vehicle spring system.

If the vehicle now drives through a curve, for example, a left curve, the inertia pendulum 26 moves laterally, for example, in the direction of the arrow 29. As a result thereof, the control piston 21' now opens the valve 23' and simultaneously therewith closes the aperture 25a' by means of the valve 24'. With a further deflection of the inertia pendulum 26, the control piston 21' opens up the supply channel 30' disposed within the housing 19 which is in communication with the line 11 so that compressed air now reaches bore 20 and from there through the radial and axial bores 31' and 32' respectively provided in the control slide valve member 22' and through the opened valve 23' into the line 9 and from there to the pneumatic spring 7 disposed along the curve inside for purposes of achieving the desired tilting of the equalization. Consequently, the pneumatic spring 7 disposed along the inside of the curve is filled with compressed air and the frame 3 or vehicle body 4 is forced or pressed against the wheel axle 2 against the effect of the centrifugal force acting against the side of the vehicle body disposed along the inside of a curve into the horizontal position thereof. By filling the pneumatic spring 7 disposed along the inside of the curve for realizing the tilting equalization, the center of gravity of the vehicle is advantageously lowered while driving through curves and, simultaneously therewith, the pneumatic springs of the spring system disposed on the outside of the curve are not stiffened but instead the pneumatic springs of the spring system disposed along the inside of the curve are adjusted, in principle, to a lesser load.

As a result of the air pressure effective, with an opened valve 23', on the end face of the control piston 21' which prevails within the pneumatic spring 7, the respective control piston 21' together with the control slide valve member 22' is returned in opposition to the force of the inertia pendulum 26 to such an extent in the direction of the initial position thereof until the discharge of the channel or duct 30' into bore 20 is closed off or covered by the control piston 21'. Depending on the relative force of the inertia pendulum 26, i.e., whether the latter is larger or smaller, a variable air pressure is automatically adjusted thereby within the pneumatic springs 7 whereby the vehicle body assumes, during curve drives, an unequivocal position. During alternate curve drives, the response times of the control installation in accordance with the present invention are very small since the inertia pendulum 26 finds itself near its zero position if the control piston 21 or 21' just covers the channel 30.

As soon as the vehicle leaves a curve and passes over into straight drive, the force of the inertia pendulum 26 lessens and the inertia pendulum 26 swings back to its original position. As a result thereof, the valve 23 or 23' closes and the valve 24 or 24' previously kept closed with a filled pneumatic spring 7 opens so that the compressed air may escape out of the pneumatic spring 7 through the valve 24 or 24' and through the aperture 28 or 28' into the atmosphere whereupon the pneumatic springs 7 for the tilting equalization again become effective as pneumatically actuated damping arrangements with continued straight drives.

The center position of the control slide valve member 22 and 22' together with the control pistons 21 and 21' thereof is assured during the occurrence of road shocks or the like by the provision of springs 35 arranged on each side of the control slide valve member 22 and 22' between two valves 23 and 24 each and the two valves 23' and 24' each, respectively.

Instead of utilizing pneumatic springs 5 as main springs, the motor vehicle in accordance with the present invention may also utilize other non-guiding springs, for example, coil springs or the like while utilizing the tilting equalization in accordance with the present invention.

While I have shown and described one embodiment in accordance with the present invention, it is understood that the same is not limited thereto but is susceptible of many changes and modifications within the spirit and scope of the present invention, and I, therefore, do not wish to be limited to the details described and shown herein but intend to cover all such changes and modifications as are encompassed by the scope of the appended claims.

I claim:

1. In a motor vehicle provided with a spring system to spring-support the vehicle superstructure on the axle means thereof, an equalization system for minimizing tilting of the superstructure towards the outside of the curve, comprising pneumatic anti-tilt spring means, and control means operatively connected with said spring means for selectively controlling the anti-tilt effect of said spring means to thereby effectively reduce the lateral tilting of the vehicle superstructure toward the outside of the curve while driving through curves, a source of pressure medium, at least one of said spring means being disposed on a respective side of the vehicle, each spring means being operative to effectively move toward each other the two parts separated by said spring system and consisting of said vehicle superstructure and axle means with an increase in the pressure in the respective spring means, each of said spring means including a roller bellows provided with two end portions and an intermediate portion between said end portions, said end portions being secured to the vehicle part participating in the spring movements, and said intermediate portion being secured to a vehicle part not participating in the spring movements, and means operatively interconnecting said control means with said spring means and with said source of pressure medium to place the spring means disposed on the inside of the curve into communication with said source of pressure medium when driving through a curve while placing the spring disposed on the outside of the curve into communication with the atmosphere so as to provide thereby an effective tilting equalization.

2. In a motor vehicle provided with a spring system having pneumatic spring means to spring-support the vehicle superstructure on the axle means thereof, said pneumatic spring means including a spring disk for actuating the same and a support rod of lesser diameter than said spring disk for supporting thereon said spring disk, an equalization system for minimizing tilting of the superstructure toward the outside of the curve, comprising pneumatic auxiliary spring means including a rubber bellows with the two ends thereof secured to said spring disk and to said support rod, and enclosure means secured to said vehicle superstructure for a respective pneumatic spring means and pneumatic auxiliary spring means, the portion intermediate said ends of said bellows being secured to a respective enclosure means, control means for selectively controlling the anti-tilt effect of said auxiliary spring means to thereby effectively reduce the lateral tilting of the vehicle superstructure toward the outside of the curve while driving through curves, a source of pressure medium, at least one of said auxiliary spring means being disposed on a respective side of the vehicle, each auxiliary spring means being operative to effectively move toward each other the two parts separated by said spring system and consisting of said vehicle superstructure and axle means with an increase in pressure within the respective auxiliary spring means, and means operatively interconnecting said control means with said auxiliary spring means and with said source of pressure medium to place the auxiliary spring means disposed on the inside of the curve into communication with said source of pressure medium when driving through a curve while placing the auxiliary spring means disposed on the outside of the curve into communication with the atmosphere so as to provide thereby an effective tilting equalization.

3. In a motor vehicle provided with a spring system to spring-support the vehicle superstructure on the axle means thereof, an equalization system for minimizing tilting of the superstructure toward the outside of the curve, comprising pneumatic anti-tilt spring means, and control means operatively connected with said spring means for selectively controlling the anti-tilt effect of said spring means to thereby effectively reduce the lateral tilting of the vehicle superstructure toward the outside of the curve while driving through curves, a source of pressure medium, at least one of said spring means being disposed on a respective side of the vehicle, each spring means being operative to effectively move toward each other the two parts separated by said spring system and consisting of said vehicle superstructure and axle means with an increase in the pressure within the respective spring means, and means operatively interconnecting said control means with said spring means and with said source of pressure medium to place the spring means disposed on the inside of the curve into communication with said source of pressure medium when driving through a curve while placing the spring means disposed on the outside of the curve into communication with the atmosphere so as to provide thereby an effective tilting equalization, said control means including means operative during straight driving for enabling the essentially unthrottled admission of air into said spring means during spring movements of said axle means in one direction while enabling discharge of the air from within said spring means during spring movements in the opposite direction only with a predetermined throttling.

4. In a motor vehicle provided with a spring system having pneumatic spring means so constructed and arranged as to spring-support the vehicle superstructure on the axle means thereof, an equalization system for minimizing tilting of the superstructure toward the outside of the curve, comprising pneumatic auxiliary spring means, at least one of said auxiliary spring means being disposed on a respective side of the vehicle and including roller bellows means, at least one of said spring means associated with each of said auxiliary spring means, each of said auxiliary spring means being operatively connected between said vehicle superstructure and said axle means and disposed between said axle means and the associated spring means, control means for selectively controlling the anti-tilt effect of said auxiliary spring means to thereby effectively reduce the lateral tilting of the vehicle superstructure toward the outside of the curve while driving through curves, a source of pressure medium, each auxiliary spring means being operative to effectively move toward each other the two parts separated by said spring system and consisting of said vehicle superstructure and axle means with an increase in the pressure within the respective auxiliary spring means, and means operatively interconnecting said control means with said auxiliary spring means and with said source of pressure medium to place the auxiliary spring means disposed on the inside of the curve into communication with said source of pressure medium when driving through a curve while placing the auxiliary spring means disposed on the outside of the curve into communication with the atmosphere so as to provide thereby an effective tilting equalization.

5. In a motor vehicle, the combination according to claim 4, wherein said control means is a valve means including means effectively constituting said anti-tilt spring means shock absorbers while the vehicle moves straight ahead.

6. In a motor vehicle provided with a spring system having a plurality of first spring means so constructed and arranged as to spring-support the vehicle superstructure on the axle means thereof, an equalization system for minimizing tilting of the superstructure toward the outside of the curve, comprising a plurality of pneumatic auxiliary spring means, at least one auxiliary spring means being disposed on each vehicle side, each of said auxiliary spring means having a first spring means associated therewith, a source of pressure medium, means interconnecting each said auxiliary spring means with said pressure source including control valve means for selectively controlling the anti-tilt effect of said auxiliary spring means to thereby effectively reduce the lateral tilting of the vehicle superstructure toward the outside of the curve while driving through curves, each said auxiliary spring means being operative to effectively move toward each other the two parts separated by said spring system and consisting of said vehicle superstructure and axle means with an increase in the pressure within the respective auxiliary spring means, and actuating means for said control valve means operatively connected therewith so as to place the auxiliary spring means disposed on the inside of the curve into communication with said source of pressure medium when driving through a curve while placing the auxiliary spring means disposed on the outside of the curve into communication with the atmosphere so as to provide thereby an effective tilting equalization, said control valve means including means effectively constituting said anti-tilt auxiliary spring means shock absorbers while the vehicle moves straight ahead.

7. In a motor vehicle provided with a spring system having a plurality of first spring means so constructed and arranged as to spring-support the vehicle superstructure on the axle means thereof, an equalization system for minimizing tilting of the superstructure toward the outside of the curve, comprising a plurality of pneumatic auxiliary anti-tilt spring means, at least one auxiliary spring means being disposed on each side of the vehicle, at least one of said first spring means being associated with an auxiliary spring means, each of said auxiliary spring means being connected between said vehicle superstructure and said axle means and disposed between said axle means and the associated first spring means, a source of pressure medium, means interconnecting said auxiliary spring means with said pressure source including control valve means for selectively controlling the anti-tilt effect of said auxiliary spring means to thereby effectively reduce the lateral tilting of the vehicle superstructure toward the outside of the curve while driving through curves, each said auxiliary spring means being operative to effectively move toward each other the two parts separated by said spring system and consisting of said vehicle superstructure and axle means with an increase in the pressure within the respective auxiliary spring means, and actuating means for said control valve means operatively connected therewith so as to place the auxiliary spring means disposed on the inside of the curve into communication with said pressure source when driving through a curve while placing the auxiliary spring means disposed on the outside of the curve into communication with the atmosphere so as to provide thereby an effective tilting equalization, said control valve means including means effectively constituting said anti-tilt auxiliary spring means shock absorbers while the vehicle moves straight ahead.

8. In a motor vehicle, the combination according to claim 1, further comprising actuating means for the springs of said spring system including a spring disk and a support member of smaller diameter than the spring disk, said end portions being secured to said spring disk and support member, and enclosure means secured to said superstructure and surrounding a respective pneumatic anti-tilt spring means with said intermediate portion secured to said enclosure means.

9. In a motor vehicle, the combination according to claim 8, wherein said control means includes means for constituting said auxiliary spring means damping means during straight drives to aid in damping the spring movements absorbed by said pneumatic spring means.

10. In a motor vehicle, the combination according to claim 2, wherein said control means includes valve means to selectively place said auxiliary spring means into communication with the atmosphere during straight drives, and means including said valve means within said control means for drawing in air from the atmosphere into said auxiliary spring means essentially without throttling during spring movements of said axle means in the direction toward said vehicle superstructure while discharging the air with a predetermined throttling from said auxiliary spring means during spring movements in the opposite direction.

11. In a motor vehicle, the combination according to claim 10, wherein said control means includes an inertia pendulum controlled by the centrifugal forces to which the vehicle is subjected during curve drives, and control slide valve means controlled by said inertia pendulum including control piston means for selectively opening the communication between said source of pressure medium and said auxiliary spring means for the auxiliary spring means disposed at the inside of the curve while closing the corresponding communication between said last-mentioned auxiliary spring means and the atmosphere.

12. In a motor vehicle, the combination according to claim 11, wherein said control slide valve means is operative to assume, together with the piston means thereof after adjustment of the tilting equalization, a position close to the normal position thereof.

13. In a motor vehicle, the combination according to claim 12, further comprising spring means for retaining said control slide valve means in the normal center position thereof within said control means.

14. In a motor vehicle, the combination according to claim 3, wherein said control means includes centrifugally controlled means for selectively controlling the admission of said pressure medium to said spring means while at the same time valving the communication thereof with the atmosphere.

15. In a motor vehicle, the combination according to claim 7, wherein said actuating means includes means operating automatically in response to centrifugal forces acting on the vehicle for operating said control valve means so as to admit said pressure medium from said source to the auxiliary spring means disposed along the inside of the curve while traveling through the curve and to close the communication of said auxiliary spring means with the atmosphere which normally exists during straight drives.

16. In a motor vehicle, the combination according to claim 15, wherein said control valve means includes slide valve means operative to return near the normal position thereof after controlling the anti-tilting equalization effect.

17. In a motor vehicle, the combination according to claim 16, further comprising means seeking to retain said valve means in said normal position.

(References on following page)

References Cited in the file of this patent

UNITED STATES PATENTS

| | | |
|---|---|---|
| 2,216,854 | Sanford | Oct. 8, 1940 |
| 2,827,283 | Browne | Mar. 18, 1958 |

FOREIGN PATENTS

| | | |
|---|---|---|
| 670,361 | Great Britain | Apr. 16, 1952 |
| 741,899 | Great Britain | Dec. 14, 1955 |